(12) United States Patent
Futamura et al.

(10) Patent No.: US 6,464,611 B2
(45) Date of Patent: Oct. 15, 2002

(54) HYDRAULIC PRESSURE CONTROL DEVICE FOR AN AUTOMATIC TRANSMISSION

(75) Inventors: Suguru Futamura, Toyokawa; Noriyoshi Kondoh, Nagoya, both of (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 9 days.

(21) Appl. No.: 09/822,320

(22) Filed: Apr. 2, 2001

(65) Prior Publication Data

US 2001/0041639 A1 Nov. 15, 2001

(30) Foreign Application Priority Data

Mar. 31, 2000 (JP) ........................................ 2000-097759

(51) Int. Cl.$^7$ .............................................. F16H 61/08
(52) U.S. Cl. ....................................................... 475/128
(58) Field of Search ................................ 475/121, 127, 475/128; 477/127, 130, 131

(56) References Cited

U.S. PATENT DOCUMENTS

| | | | | |
|---|---|---|---|---|
| 5,342,253 A | * | 8/1994 | Mizobe et al. | 475/120 |
| 5,725,451 A | * | 3/1998 | Tsukamoto et al. | 475/128 |
| 5,816,977 A | * | 10/1998 | Yasue et al. | 477/138 |
| 5,888,169 A | * | 3/1999 | Jang | 475/128 |
| 5,951,439 A | * | 9/1999 | Jang | 475/128 |

FOREIGN PATENT DOCUMENTS

JP     5-296320     11/1993

* cited by examiner

*Primary Examiner*—Charles A. Marmor
*Assistant Examiner*—Ankur Parekh
(74) *Attorney, Agent, or Firm*—Burns, Doane, Swecker & Mathis, LLP (57) ABSTRACT

To reliably establish a shift in a hydraulic pressure control device for an automatic transmission in which a control valve applies a control pressure, by way of a shift valve, to a plurality of friction engaging elements, the hydraulic pressure control device is designed to establish an intermediate shift pattern. The hydraulic pressure control device includes an electronic control unit that establishes shift pattern 3 to produce the second and third gear stages and shift pattern 5 to produce the third, fourth and fifth gear stages in which ON-OFF solenoid valves under energization are combined to produce both the second and third gear stages. The hydraulic pressure control device also establishes shift pattern 4 during the transfer from shift pattern 3 to shift pattern 5 which prevents application of the control pressure from one of the control valves supplying control pressure to one of the friction engaging elements in the shift pattern 3, with the ON-OFF solenoid valves under energization being combined to produce the third gear stage.

15 Claims, 6 Drawing Sheets

| shift pattern | ON-OFF S/V | | | FRICTIONAL ENGAGING ELEMENTS | | | | | GEAR STAGES WHICH CAN BE PRODUCED | | | | | | |
|---|---|---|---|---|---|---|---|---|---|---|---|---|---|---|---|
| | 200 | 210 | 220 | C1 | C2 | C3 | B1 | B2 | N | 1 | 2 | 3 | 4 | 5 | 6 |
| 1 | ○ | × | × | ③ | | | ① | ② | ☆ | * | * | | | | |
| 2 | ○ | × | ○ | ◎ | | | ① | ② | | ☆ | ☆ | | | | |
| 3 | ○ | ○ | ○ | ◎ | | ② | ① | | | | * | ☆ | | | |
| 4 | ○ | ○ | × | ◎ | | ② | | | | | | * | | | |
| 5 | × | ○ | × | ① | ③ | ② | | | | | | * | ☆ | ☆ | |
| 6 | × | ○ | ○ | ① | ◎ | ② | | | | | | | * | * | |
| 7 | × | × | ○ | ① | ◎ | ② | ③ | | | | | | * | * | ☆ |

ON-OFF S/V:
 ○ energized, × deenergized

FRICTIONAL ENGAGING ELEMENTS:
 ① Frictional engaging element which can be controlled by the linear solenoid valve 60
 ② Frictional engaging element which can be controlled by the linear solenoid valve 70
 ③ Frictional engaging element which can be controlled by the linear solenoid valve 80
 ◎ Frictional engaging element which can be controlled by base pressure GEAR STAGES WHICH CAN BE PRODUCED:
 ☆ gear stage under constant driving
 * gear stage during a shift

|  | C 1 | C 2 | C 3 | B 1 | B 2 |
|---|---|---|---|---|---|
| 1st | ○ |  |  |  | ○ |
| 2nd | ○ |  |  | ○ |  |
| 3rd | ○ |  | ○ |  |  |
| 4th | ○ | ○ |  |  |  |
| 5th |  | ○ | ○ |  |  |
| 6th |  | ○ |  | ○ |  |
| reverse |  |  | ○ |  | ○ |

○:engaged、  Blank : disengaged

Fig. 5

| shift pattern | ON-OFF S/V | | | FRICTIONAL ENGAGING ELEMENTS | | | | | GEAR STAGES WHICH CAN BE PRODUCED | | | | | | |
|---|---|---|---|---|---|---|---|---|---|---|---|---|---|---|---|
| | 200 | 210 | 220 | C1 | C2 | C3 | B1 | B2 | N | 1 | 2 | 3 | 4 | 5 | 6 |
| 1 | O | X | X | ③ | | | ① | ② | ☆ | * | * | | | | |
| 2 | O | X | O | ◎ | | | ① | ② | | ☆ | ☆ | | | | |
| 3 | O | O | O | ◎ | | ② | ① | | | | | * | ☆ | | |
| 4 | O | O | X | ◎ | | ② | | | | | | * | | | |
| 5 | X | O | X | ① | ③ | ② | | | | | | * | ☆ | ☆ | |
| 6 | X | O | O | ① | ◎ | ② | | | | | | | * | * | |
| 7 | X | X | O | ① | ◎ | ② | ③ | | | | | | * | * | ☆ |

ON-OFF S/V:
  O energized, X deenergized

FRICTIONAL ENGAGING ELEMENTS:
  ① Frictional engaging element which can be controlled by the linear solenoid valve 60
  ② Frictional engaging element which can be controlled by the linear solenoid valve 70
  ③ Frictional engaging element which can be controlled by the linear solenoid valve 80
  ◎ Frictional engaging element which can be controlled by base pressure GEAR STAGES WHICH CAN BE PRODUCED:
  ☆ gear stage under constant driving
  * gear stage during a shift

Fig. 6

| Shift Pattern | Gear Stage | C 1 | C 2 | C 3 | B 1 | B 2 |
|---|---|---|---|---|---|---|
| 3 | 2nd | ◎ |  | ○ | ● |  |
|   | 3rd | ◎ |  | ● | ○ |  |

○ : low pressure, ● : high pressure, ◎ : base pressure

Fig. 7

| Shift Pattern | Gear Stage | C 1 | C 2 | C 3 | B 1 | B 2 |
|---|---|---|---|---|---|---|
| 4 | 3rd | ◎ |  | ● |  |  |

○ : low pressure, ● : high pressure

Fig. 8

| Shift Pattern | Gear Stage | C 1 | C 2 | C 3 | B 1 | B 2 |
|---|---|---|---|---|---|---|
| 5 | 3rd | ● | ○ | ● |  |  |
|   | 4rt | ● | ● | ○ |  |  |
|   | 5th | ○ | ● | ● |  |  |

○ : low pressure, ● : high pressure

Fig. 9

| Shift Pattern | Gear Stage | C 1 | C 2 | C 3 | B 1 | B 2 |
|---|---|---|---|---|---|---|
| 6 | 4th | ● | ◎ | ○ |  |  |
|   | 5th | ○ | ◎ | ● |  |  |

○ : low pressure, ● : high pressure, ◎ : base pressure

Fig. 10

| Shift Pattern | Gear Stage | C 1 | C 2 | C 3 | B 1 | B 2 |
|---|---|---|---|---|---|---|
| 7 | 4th | ● | ◎ | ○ | ○ |  |
|   | 5th | ○ | ◎ | ● | ○ |  |
|   | 6th | ○ | ◎ | ○ | ● |  |

○ : low pressure, ● : high pressure, ◎ : base pressure

HYDRAULIC PRESSURE CONTROL DEVICE FOR AN AUTOMATIC TRANSMISSION

This application is based on and claims priority under 35 U.S.C. §.119 with respect to Japanese Application No. 2000-097759 filed on Mar. 31, 2000, the entire content of which is incorporated herein by reference.

FIELD OF THE INVENTION

The present invention generally relates to automatic transmissions. More particularly, the present invention pertains to a hydraulic pressure control device for an automatic transmission which shifts a gear stage by controlling the hydraulic pressure to be applied to a plurality of friction engaging elements.

BACKGROUND OF THE INVENTION

In a known type of hydraulic pressure control device for an automatic transmission, control pressure is applied to a plurality of friction engaging elements by way of a corresponding linear solenoid valve depending on the shift signal. In this device, the application of the control pressure to one friction engaging element is carried out through use of a particular linear solenoid valve so that by controlling the energization of each of the linear solenoid valves, it is possible to apply the control pressure to the corresponding friction engaging element.

However, in this known device, the number of linear solenoid valves required for effecting engagement of the friction engaging elements is equal to the number of friction engaging elements. The result is a rather expensive device because linear solenoid valves are relatively expensive. Also, the energization control of each of the linear solenoid valves which is required for shifting becomes relatively complex, thus increasing the overall cost associated with the device.

To address this problem, it has been proposed to apply control pressure to a several of the friction engaging elements by switching one linear solenoid valve. This hydraulic pressure control device is configured to operate such that a control pressure outputted from a sole control valve under the control of a linear solenoid valve is applied to a plurality of friction engaging elements by way of a shift valve which is switched by an ON-OFF solenoid valve. The shift valve is switched depending on the gear stage to be produced in order to cause the shift valve to engage or disengage each of the associated friction engaging elements. According to this device, the ON-OFF solenoid valve, which is relatively inexpensive when compared to a linear solenoid valve, is combined with a linear solenoid valve. As a result, the number of linear solenoid valves in the control device can be reduced relative to the number of friction engaging elements, thus establishing an advantage from the standpoint of cost.

However, in this device, when performing a jumping shift (e.g., a shift from the fifth gear stage to the third gear stage or a shift from the third gear stage to the fifth gear stage) or a multiple shift (i.e., during a shift to one specific gear stage, another shift is made to another gear stage by changing the shift command), it is necessary to switch the shift valve and the friction engaging elements to be applied with the respective control pressure from the control valve at the same time. More specifically, a shift valve switching operation must be performed involving switching the energization condition of the ON-OFF solenoid valves, and at the same time the energization of the linear solenoid valves must be controlled to control the control pressure. In such a case, the control valve which applies the control pressure to the shift valve is switched and a switching operation of the shift valve is performed by switching the energization condition of the ON-OFF solenoid valve. Thus, to produce the desired gear stage, the timing of the switching of the shift valve must be synchronized with the timing of the switching of the control valve which applies the control pressure to the shift valve. However, experience shows that a time lag appears which ranges from initiation of the output of the switching signal to the ON-OFF solenoid valve for switching the ON-OFF solenoid valve to termination of the switching of the shift valve, and another time lag also appears which ranges from initiation of the output of the adjusting pressure from the linear solenoid valve after energizing control thereof to the output of the control pressure from the control valve to the shift valve. It is thus quite difficult to synchronize the shift valve switching with the control valve switching, and this may cause termination of the switching operation of the linear solenoid valve prior to a termination of the switching of the shift valve and/or vice versa. Under such situations, shift related problems or drawbacks may occur such as insufficient application of the control pressure to the required friction engaging element and/or application of the control pressure to an unnecessary friction engaging element.

Thus, a need exists for a hydraulic pressure control device for an automatic transmission that is not as susceptible to the difficulties and a drawbacks mentioned above.

More particularly, a need exists for a hydraulic pressure control device for an automatic transmission that can more reliably establish a desired shift by controlling the application of control pressure to the friction engaging elements by way of a shift valve.

SUMMARY OF THE INVENTION

According to one aspect of the invention, a hydraulic pressure control device for an automatic transmission includes a plurality of linear solenoid valves each of which adjusts a hydraulic pressure outputted from an oil pump and outputs an adjusting pressure in response to a current applied thereto, a plurality of control valves each connected to one of the linear solenoid valves and outputting a control pressure in response to the adjusting pressure outputted from the corresponding linear solenoid valve, and a plurality of friction engaging elements each engaged or disengaged depending on the control pressure applied thereto, with the friction engaging elements producing a plurality of gear stages of the automatic transmission depending on combinations of different engaged and disengaged conditions of the friction engaging elements. In addition, a plurality of shift valves are each connected to one of the control valves to switch the friction engaging elements to which the control pressure is applied depending on the hydraulic pressure applied to the shift valves, and a plurality of ON-OFF solenoid valves are each connected to one of the shift valves to control application of the hydraulic pressure to each of the shift valves through energized conditions of the ON-OFF solenoid valves. A control unit controls application of current to each of the linear solenoid valves and the ON-OFF solenoid valves, and controls the adjusting pressure applied to each of the control valves and the control pressure applied to each of the friction engaging elements by controlling the hydraulic pressure applied to each of the shift valves. The control unit establishes a first shift pattern and a second shift pattern which produce gear stages by different combinations of energized or deenergized conditions of at least some of the ON-OFF solenoid valves. The control unit establishes an intermediate shift pattern during a transfer from the first shift pattern to the second shift pattern, such that the intermediate shift pattern makes it impossible to apply the control pressure from a specific control valve to the friction engaging element in case the friction engaging element to which the control pressure is applied from the specific control valve under the first shift pattern differs from the friction engaging element to which the control pressure is applied from the specific control valve under the second shift pattern by switching the shift valve.

In accordance with the present invention, in a shift control in which a shift is made such that switching the shift valve and switching the control valve are made concurrently during transfer from the first shift pattern to the second shift pattern, the application of control pressure from the specific control valve to the friction engaging element in the intermediate shift pattern is prevented. Next, during transfer from the intermediate shift pattern to the second shift pattern, the specific control valve from which application of control pressure in the intermediate shift pattern was prevented, is now able to apply control pressure to another friction engaging element other than the friction engaging element to which it applied control pressure in the first shift pattern. Thus, transfer is made from the first shift pattern to the second shift pattern.

Thus, in situations where a different friction engaging element is applied with control pressure from the specific control valve in the first and second shift patterns, the intermediate shift pattern produces a condition under which the application of the control pressure from the specific control valve to the friction engaging element is prevented (i.e., made impossible). As a result, there is a reduced need or no need for synchronization between the time lag ranging from the outputting of the switching signal to the ON-OFF solenoid valve from the control unit to the termination of the switching of the shift valve and the time lag ranging from the initiation of the energization control of the linear solenoid valve to the outputting of the control pressure from the control valve as a result of the outputting of the adjusting pressure from the linear solenoid valve, which fails to cause termination of the switching operation of the linear solenoid valve prior to a termination of the switching of the shift valve and/or vice versa. Under such situations, little or no shift related problems or drawbacks occur such as insufficient application of the control pressure to the required friction engaging element and/or application of the control pressure to an unnecessary friction engaging element. Thus, the shift control performance is remarkably increased.

The aforementioned specified control valve refers to a designated valve selected from the plural control valves. The specified control valve in the first shift pattern is same as the specified control valve in the second shift pattern.

In addition, the linear solenoid valve is a valve which is capable of outputting the adjusting pressure in a continual mode depending on the amount of current energized or supplied thereto, utilizing the hydraulic pressure or oil pressure outputted from the oil pump directly or indirectly via another valve. The ON-OFF solenoid valve is a valve which is capable of switching the shift valve on-and-off mode depending on its energized and deenergtzed condition.

According to another aspect of the invention, a hydraulic pressure control device for an automatic transmission includes a plurality of linear solenoid valves each of which adjusts a hydraulic pressure outputted from an oil pump and outputs an adjusting pressure in response to a current applied to the linear solenoid valve, a plurality of control valves each connected to a respective one of the linear solenoid valves to output a control pressure in response to the adjusting pressure outputted from the respective linear solenoid valve, and a plurality of friction engaging elements each of which is engaged or disengaged depending on the control pressure applied thereto. The friction engaging elements produce different gear stages of the automatic transmission depending on different combinations of engaged and disengaged conditions of the friction engaging elements. A plurality of shift valves are each connected to one of the control valves to switch the friction engaging elements to which the control pressure is applied depending on the hydraulic pressure applied to the shift valves, and a plurality of ON-OFF solenoid valves are each connected to one of the shift valves to control application of the hydraulic pressure to each of the shift valves through energized and deenergized conditions of the ON-OFF solenoid valves. A control unit controls application of current to each of the linear solenoid valves and the ON-OFF solenoid valves, and controls the adjusting pressure applied to each of the control valves and the control pressure applied to each of the friction engaging elements by controlling the hydraulic pressure applied to each of the shift valves. The control unit establishes a plurality of shift patterns producing gear stages by different combinations of energized or deenergized conditions of at least some of the ON-OFF solenoid valves. The plurality of shift patterns include one shift pattern producing at least two gear stages and a different shift pattern producing at least two gear stages, with one of the gear stages in the one shift pattern being the same as one of the gear stages in the different shift pattern. One of the control valves applies control pressure to one of the friction engaging elements during the one shift pattern and applies control pressure to a different friction engaging element during the another shift pattern. The control unit is adapted to establish during transfer from the one shift pattern to the another shift pattern an intermediate shift pattern during which control pressure from the one control valve to the one friction engaging element is prevented.

In accordance with another aspect of the invention, a method of shifting an automatic transmission involves supplying control pressure from a plurality of control valves to a plurality of friction engaging elements to effect engagement and disengagement of different combinations of the friction engaging elements and produce a plurality of different gear stages, establishing one shift pattern that includes at least one gear stage, transferring to a different shift pattern that includes a gear stage different from the one gear stage, and prohibiting application of control pressure from one of the control valves to one of the friction engaging elements during transfer from the one shift pattern to the different shift pattern when the one control valve applies control pressure to the one friction-engaging element under the one shift pattern and applies control pressure to another friction engaging element different from the one friction engaging element under the different shift pattern.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements and wherein.

DETAILED DESCRIPTION OF THE INVENTION

Figure 1:
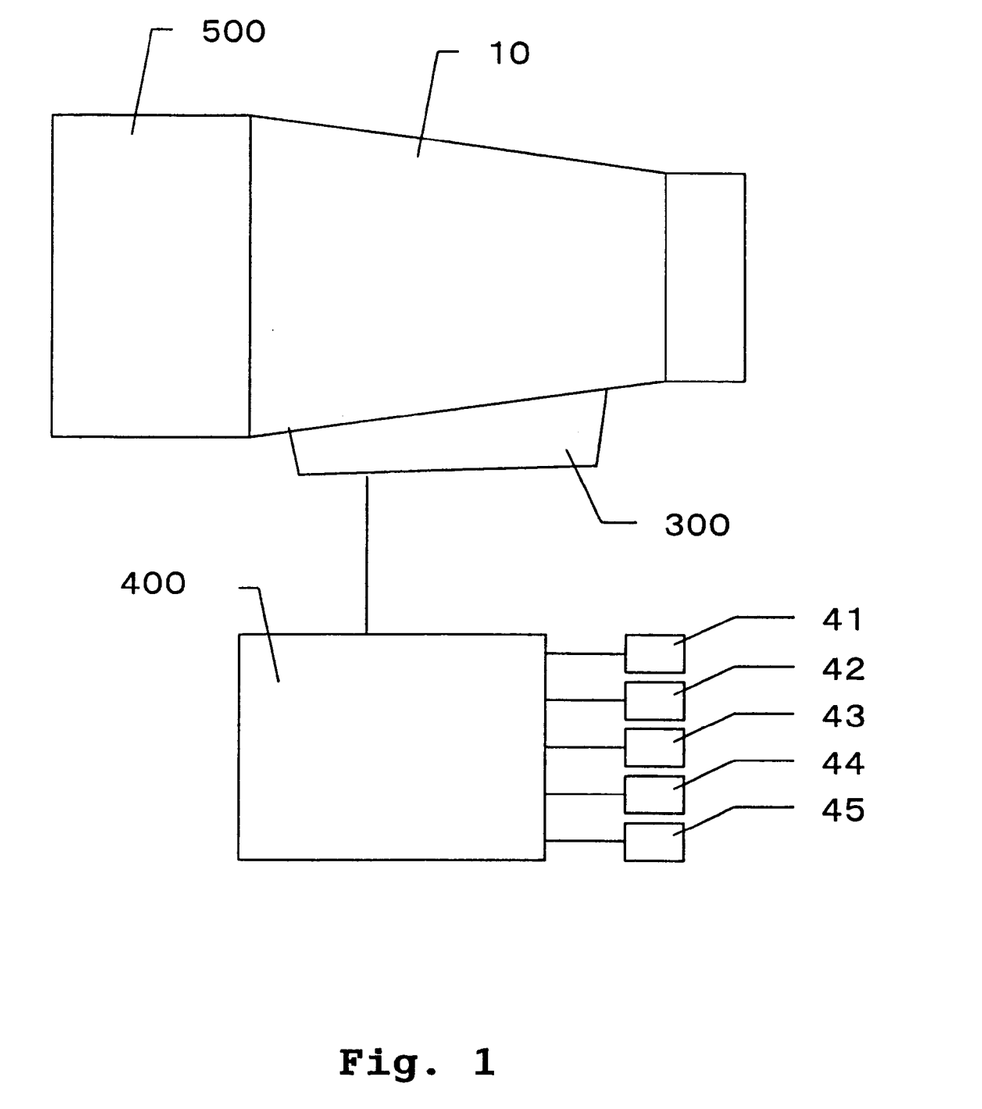
FIG. 1 is a block diagram of an automatic transmission with which is associated the hydraulic pressure control device of the present invention.
Figure 2:
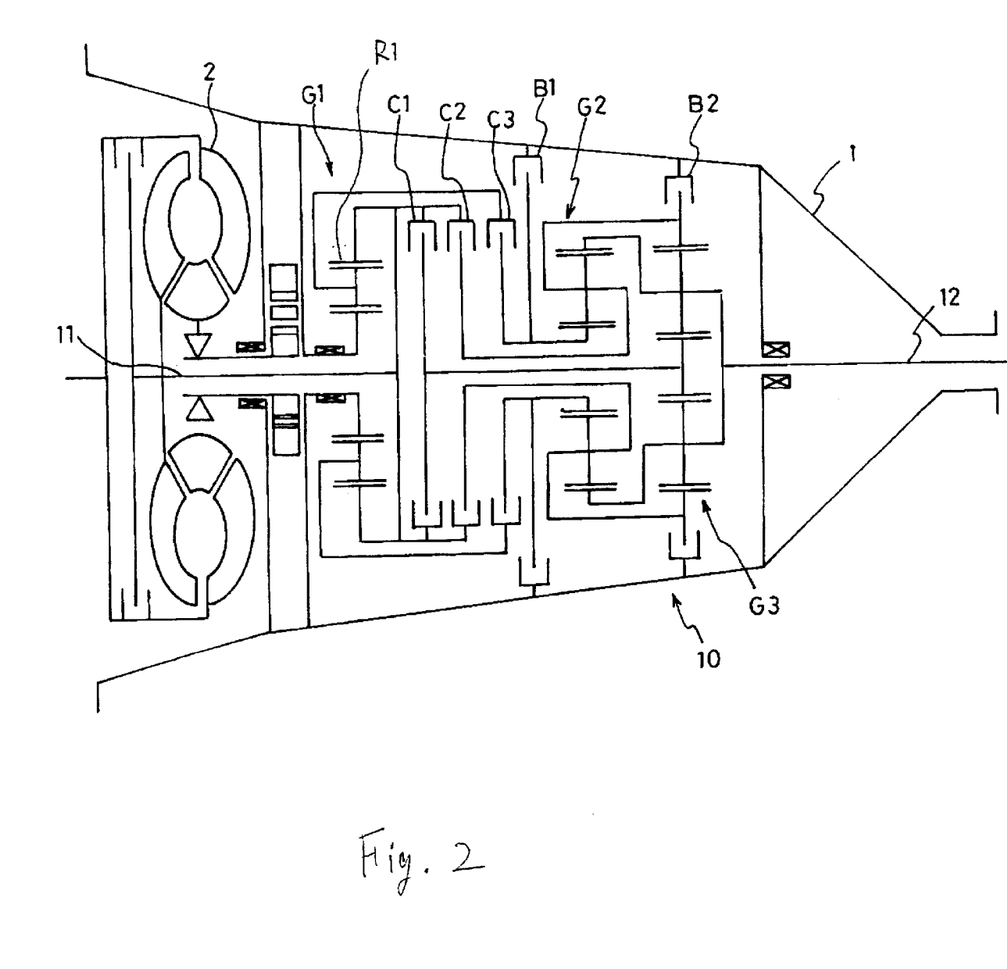
FIG. 2 is a schematic illustration of the automatic transmission shown in FIG. 1.

Referring initially to FIG. 1, the automatic transmission system is comprised of, for example, an automatic transmission 10 which is connected to an output shaft of an engine 500, a hydraulic pressure control portion 300, and an electronic control portion 400 as a control unit. The automatic transmission 10 includes features such as shown in FIG. 2, the details of which will be described in more detail below. Generally speaking, the automatic transmission is provided with five hydraulically-actuated friction engaging elements, including a first friction brake B1, a second friction brake B2, a first friction clutch C1, a second friction clutch C2, and a third friction clutch C3.

Figure 3:
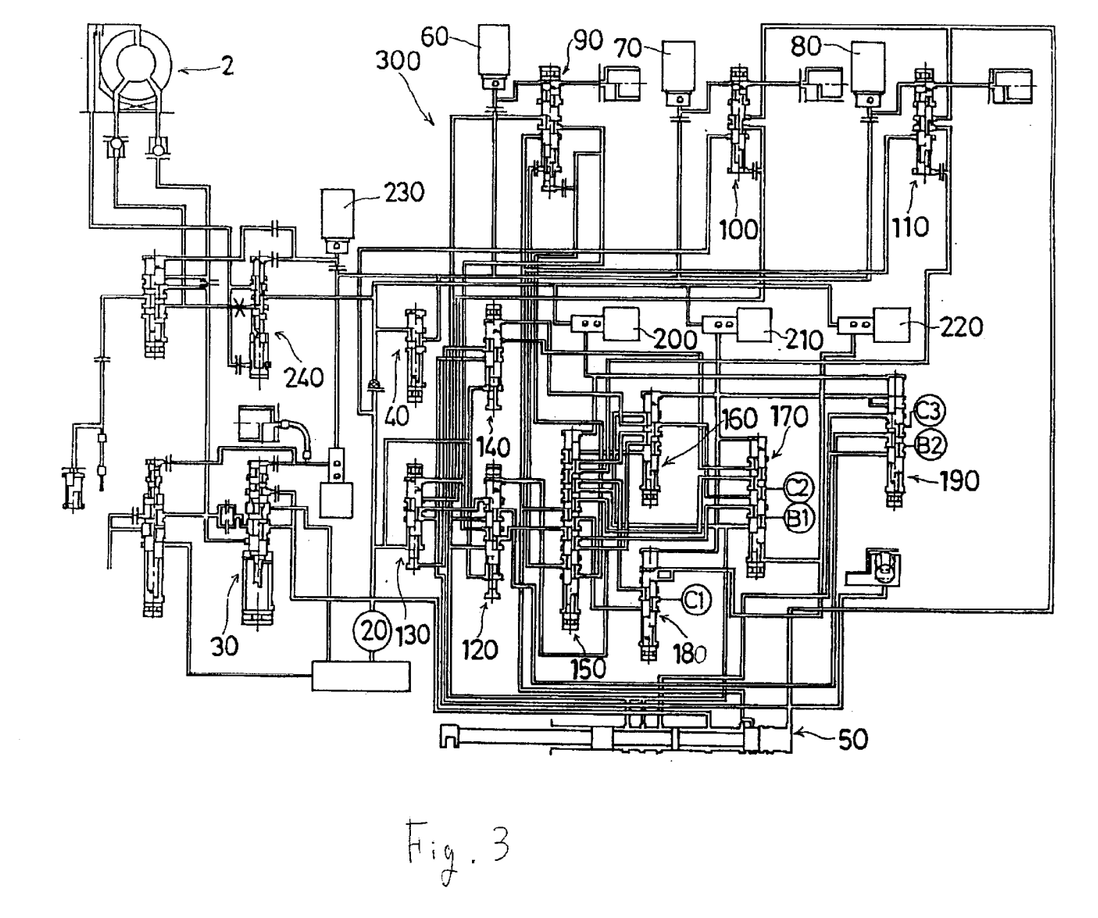
FIG. 3 is a hydraulic circuit diagram of the hydraulic control portion of the automatic transmission illustrated in FIG. 1.

The hydraulic pressure control portion 300 having the hydraulic circuit diagram shown in FIG. 3 is incorporated in the automatic transmission 10 for supplying and draining hydraulic pressure to and from each of the hydraulically-actuated friction engaging elements B1, B2, C1, C2, C3. The electronic control portion 400 controls a plurality of solenoid valves in the hydraulic pressure control portion 300. The hydraulic pressure control portion 300 and the electronic control portion 400 together constitute a hydraulic pressure control device.

As can be seen from FIG. 2, in addition to the aforementioned five hydraulically-actuated friction engaging elements B1, B2, C1, C2, and C3, the automatic transmission 10 includes an input shaft 11 as an output shaft of a torque converter 2, an output shaft 12 connected to each of the wheel axles by way of a differential, a first single pinion planetary gear unit GI which has a ring gear R1 connected to the input shaft 11, a second single pinion planetary gear unit G2, and a third single pinion planetary gear unit G3. The automatic transmission 10 is designed to produce six forward gear stages and one reverse gear stage. The forward gear stages include first ($1^{st}$), second ($2^{nd}$), third ($3^{rd}$), and fourth ($4^{th}$) forward gear stages under a normal or underdrive mode, and fifth ($5^{th}$) and sixth ($6^{th}$) gear stages under an overdrive mode. The forward and reverse gear stages are produced by hydraulic control through adjustment of the hydraulic control pressure of each of the five hydraulically-actuated friction engaging elements B1, B2, C1, C2, C3 which is performed by the hydraulic pressure control device comprised of the hydraulic pressure control portion 300 and the electronic control portion 400.

Figure 4:
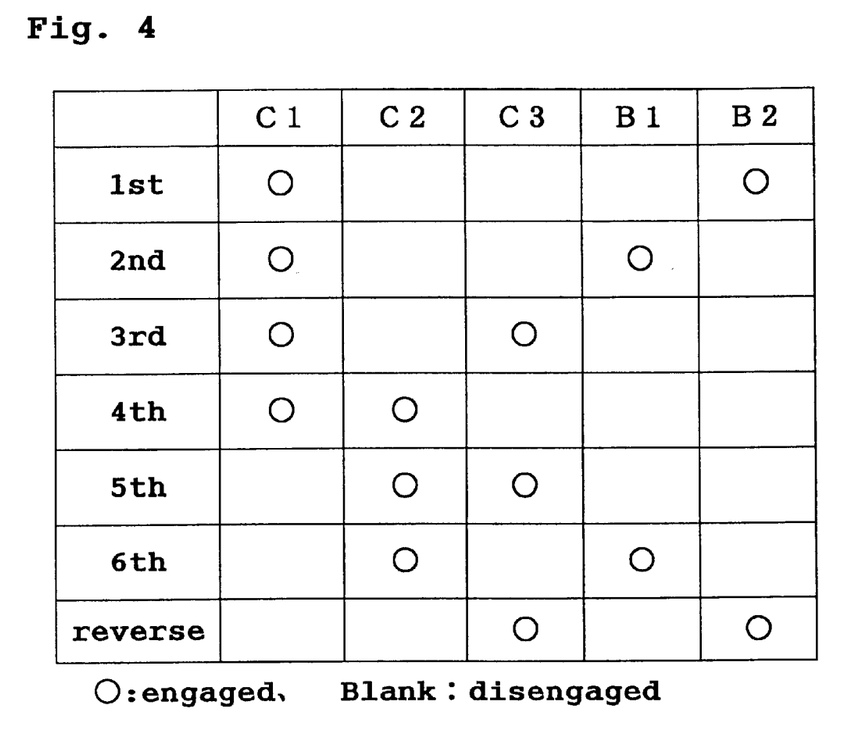
FIG. 4 is a chart showing the engagement and release conditions of each of the friction engaging elements for producing various gear stages.

FIG. 4 illustrates the engaged and disengaged condition of each of the hydraulically-actuated friction engaging elements B1, B2, C1, C2, C3 to produce the various gear stages.

Referring to FIG. 3, the hydraulic pressure control portion 300 includes an oil pump 20, a regulator valve 30 for generating a base pressure, a modulator valve 40 for reducing the base pressure, a manual valve 53 for switching the drive range of the automatic transmission 10 when operated manually, and three linear solenoid valves 60, 70, 80 each of which outputs an adjusting pressure depending on the energized current supplied thereto by utilizing the hydraulic pressure supplied from the oil pump 20 via the regulator valve 30. The hydraulic pressure control portion 300 also includes three control valves 90, 100, 110 which each receive the adjusting pressure from a respective one of the linear solenoid valves 60, 70, 80 and generate an outputted control pressure having a magnitude that depends on the received adjusting pressure, three fail-safe valves 120, 130, 140 for preventing extra engagements of each of the friction engaging elements by receiving the control pressures outputted from the control valves 90, 100, 110, respectively, and five shift valves 150, 160, 170, 180, 190 which switch the control pressure to be applied to the friction engaging elements in response to the pressure received as the control pressure from the control valves 90, 100, 110 by way of the respective fail-safe valves 120, 130, 140. The hydraulic pressure control portion 300 further includes three ON-OFF solenoid valves 200, 210, 220 which switch the positions of the shift valves 150, 160, 170, 180, 190 in response to energizing currents.

In the illustrated and described version of the present invention, the adjusting pressure is at a maximum when the linear solenoid valves 60, 70, 80 are de-energized and is reduced or made smaller as the energizing current applied to each of the linear solenoid valves 60, 70, 80 increases. Thus, when the energizing current reaches its maximum value the application of the adjusting pressure to the control valves 90, 100, 110 is interrupted or stopped, and when the linear solenoid valves 60, 70, 80 are de-energized the control pressure outputted from the control valve becomes a maximum value. During energization of the linear solenoid valves 60, 70, 80 as the energizing current applied to each of the linear solenoid valves 60, 70, 80 increases, the control pressure proportionally decreases and when the energizing current reaches its maximum value no control pressure is outputted or generated.

The ON-OFF solenoid valve 200 is in the form of a normally-opened valve which, when it is energized, prevents application of the hydraulic pressure to the shift valve and when de-energized permits application of the hydraulic pressure to the shift valve. Each of the ON-OFF solenoid valves 210 220 is in the form of a normally-closed valve which, upon being energized, permits application of the hydraulic pressure to the shift valve and, upon being de-energized, prevents application of the hydraulic pressure to the shift valve. In addition to the three linear solenoid valves 60, 70, 80, another linear solenoid valve 230 is provided for generating an adjusting pressure to be applied to a lock-up control valve 240 which controls the lock-up of the torque converter 2.

The electronic control portion 400 includes a microcomputer electrically connected to an engine rotational sensor 41 which detects the rotational amount of the output shaft of the engine 500, an input shaft rotational sensor 42 which detects the rotational amount of the input shaft 11 of the automatic transmission 10, an output shaft rotational sensor 43 which detects the rotational amount of the output shaft 12 of the automatic transmission 10 which is indicative of the speed of the vehicle, a throttle opening sensor 44 detecting the degree of throttle opening of the engine 500 which is indicative of the engine load, and a position sensor 45 which detects the position of a shift lever operated by driver. Based on the signals from the respective sensors, the electronic control portion 400 controls the linear solenoid valves 60, 70, 80 and the ON-OFF solenoid valves 200, 210, 220 to produce a desired gear stage.

The electronic control portion 400 is provided with a plurality of shift patterns designed to produce certain gear stages by controlling the control pressure applied to the friction engaging elements in such a manner that only the energization of the linear solenoid valves 60, 70, 80 is controlled to provide the gear stages in a particular shift pattern, without the need for controlling or switching the energization of the ON-OFF solenoid valves 200, 210, 220. In the illustrated and described embodiment of the present invention, seven shift patterns (i.e., shift patterns 1–7) are possible which are obtained from different combinations of the energized or deenergized conditions of all of the ON-OFF solenoid valves 200, 210, 220.

Figure 5:
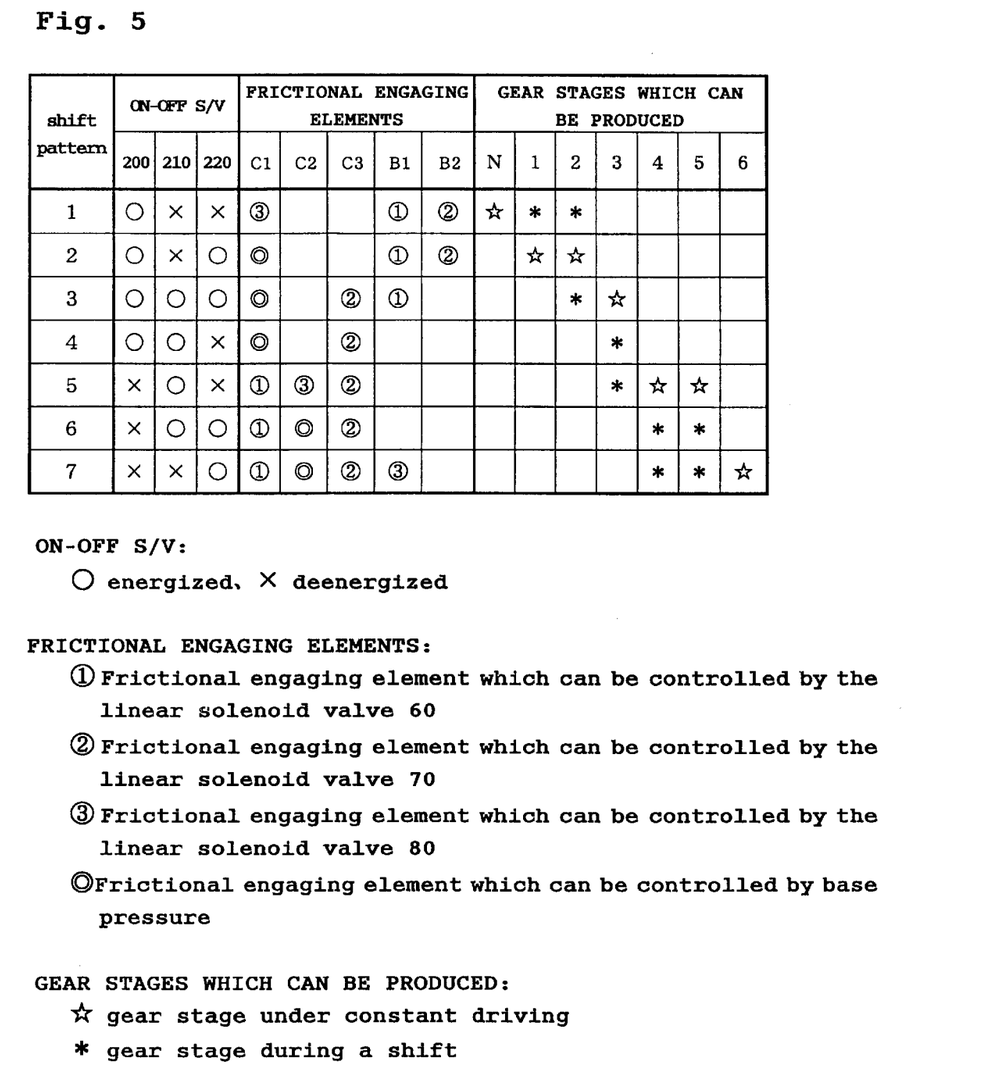
FIG. 5 is a chart showing the different shift patterns in relation to the condition of the ON-OFF solenoid valves, the linear solenoid valves that control the engagement of the various friction elements and the possible gear stages that can be produced.

FIG. 5 shows the different shift patterns in relation to the pattern of engagement and release of each of the friction engaging elements to produce the various gear stages. In FIG. 5, the column designated "ON-OFF S/V" indicates the energized or deenergized condition of each of the solenoid valves 200, 210, and 220 In each shift pattern. The column identified as "FRICTIONAL ENGAGING ELEMENTS" indicates the friction engaging elements to which the control pressure is applied from respective ones of the control valves 90, 100, 110 in each shift pattern. The column designated "GEAR STAGES WHICH CAN BE PRODUCED" indicates the gear stage (gear stage under constant driving or gear stage during a shift) which can be produced in each shift pattern. The gear stage while the vehicle is under constant driving in each shift pattern is set at a higher gear stage side which is capable of being outputted from the view point of the response characteristic upon down-shift.

An aspect of the present invention relates to the provision of intermediate shift patterns between various ones of the shift patterns. Described below is an explanation of the shift operation in the shift patterns 3–7 relating to the provision of intermediate shift patterns between several of the shift patterns. A discussion of the shift operation of the shift patterns 1 and 2 is not included here as such shift operation is similar to that in other vehicles and is thus known to those in the art.

When transferring from shift pattern 2 to shift pattern 3, although the second friction brake B2 is replaced by the third friction clutch C3 as the friction engaging element to which is applied the control pressure from the control valve 70 (i.e., the indication ② in FIG. 5), in shift patterns 2 and 3 the control valve 70 does not generate a high pressure which is sufficient control pressure to engage the friction engaging element. Thus, the shift pattern transfer and the switching of the control pressure are not made concurrently, and so it is generally not necessary to set an intermediate shift pattern between shift patterns 2 and 3. It is to be noted that in FIGS. 6–10, the designation low pressure (○) means an insufficient control pressure for engaging the friction engaging element, while the designation high pressure (●) means a sufficient control pressure for engaging the friction engaging element.

Figure 6:
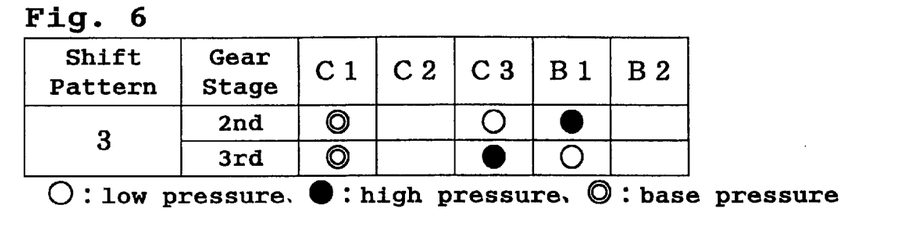
FIG. 6 is a chart showing the transmission condition in shift pattern "3"

The following explanation relates to the transfer from shift pattern 3 to shift pattern 5 when a shift from the third gear stage to the fourth gear stage or from the third gear stage to the fifth gear stage is made while the vehicle is under constant driving. FIG. 6 shows the shift or transmission condition in shift pattern 3. When transferring from shift pattern 3 to shift pattern 5, shift pattern 3 constitutes a first shift pattern, shift pattern 5 constitutes a second shift pattern, the control valve 90 constitutes a specific control valve, and the shift valve 170 constitutes a specific shift valve.

Under shift pattern 3, the energized condition of each of the ON-OFF solenoid valves 200, 210, 220 can be seen from the illustration in FIG. 5. The position of each of the shift valves 150, 170 is the left side position illustrated in FIG. 3 while the position of each of the shift valves 160, 180 190 is the right side position illustrated in FIG. 3. Under such a condition, as can be seen from FIG. 3 and FIG. 5, the first friction clutch C1 is applied with the base pressure by way of the manual valve 50, the third friction clutch C3 is applied with the control pressure generated from the control valve 100 which is regulated or adjusted by the linear solenoid valve 70, and the first friction brake B1 is applied with the control pressure generated from the control valve 90 which is regulated or adjusted at the linear solenoid valve 60. To produce the third gear stage, the linear solenoid valve 70 is deenergized so that the control pressure from the control valve 100 becomes sufficient (high pressure) for engaging the third friction clutch C3, while the linear solenoid valve 60 is energized in a controlled manner so that the control pressure from the control valve 90 becomes insufficient (low pressure) for engaging the first friction brake B1.

As seen from FIGS. 5 and 6, to produce the second gear stage in shift pattern 3, the linear solenoid valve 70 is energized under control so that the control pressure from the control valve 100 becomes insufficient (low pressure) for engaging the third friction clutch C3, while the linear solenoid valve 60 is deenergized so that the control pressure from the control valve 90 becomes sufficient (high pressure) for engaging the first friction brake B1.

Figure 7:
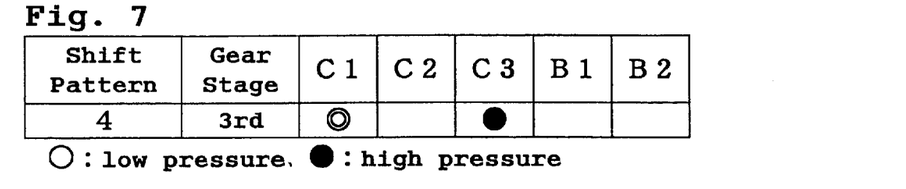
FIG. 7 is a chart showing the transmission condition in shift pattern "4"

FIG. 7 illustrates a chart of the transmission condition representing shift pattern 4 which serves as an intermediate shift pattern when transferring from shift pattern 3 to shift pattern 5, and vice versa. The condition of the shift valve 170 under shift pattern 3 is changed to the right side condition illustrated in FIG. 3 when the ON-OFF solenoid valve 220 is deenergized to transfer from shift pattern 3 to shift pattern 4. Deenergizing the linear solenoid 60 immediately upon completion of the switching of the shift valve 170 as can be seen from the composition of shift pattern 3 and shift pattern 4 in FIG. 5 increases the control pressure which is outputted from the control valve 90. Under the resulting condition, the shift valve 170 interrupts fluid communication between the control valve 90 and the first friction brake B1 so that the control pressure is not applied to the first friction brake B1. As a result, the gear stage is maintained at the third gear stage. Due to the fact that shift pattern 4 is an intermediate shift pattern which appears only when a shift pattern transfer occurs that results from gear stage change, immediately when the control pressure from the control valve 90 becomes high, a transfer occurs from shift pattern 4 to shift pattern 5.

Figure 8:
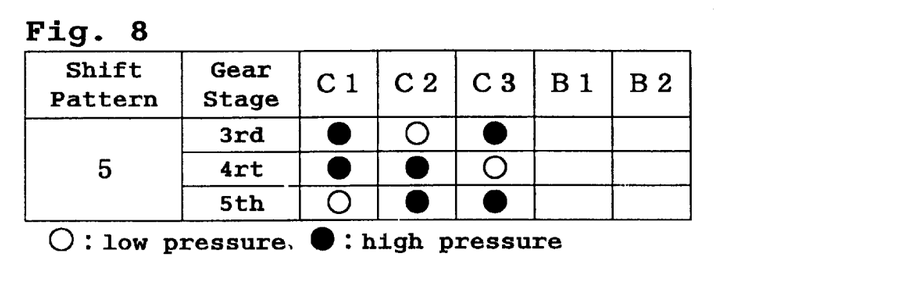
FIG. 8 is a chart showing the transmission condition in shift pattern "4"

FIG. 8 shows the transmission condition under shift pattern 5. With respect to the transfer from shift pattern 5 to shift pattern 7, shift pattern 5 constitutes a first shift pattern, shift pattern 7 constitutes a second shift pattern, the control valve 110 constitutes a specific control valve, and the shift valve 170 constitutes a specific shift valve.

The condition or position of the shift valve 150 under shift pattern 4 is changed to the right side condition illustrated in FIG. 3 when the ON-OFF solenoid valve 200 is deenergized as a result of the transfer from shift pattern 4 to shift pattern 5. Thus, fluid communication between the control valve 90 and the first friction clutch C1 is communicated by way of the shift valve 180. While the transfer is made from shift pattern 4 to shift pattern 5, the energization of the linear solenoid valve 80 is controlled such that the control pressure generated from the control valve 110 is adjusted (low pressure) so as not to engage the second friction clutch C2, while the linear solenoid valve 60 is energized such that the control pressure generated from the control valve 90 is adjusted to be sufficient (high pressure) for engaging the first friction clutch C1. Moreover, the linear solenoid valve 70 continues to be deenergized, which results in the third friction clutch C3 continuing to be applied with sufficient control pressure (high pressure) which makes it possible to engage the third friction clutch C3. In response to a shift request, the linear solenoid valves 60, 70, 80 are controlled through energization and deenergization according to the chart shown in FIG. 8, thereby producing the fourth or fifth gear stage.

A transfer from shift pattern 5 to shift pattern 3 is made in the reverse mode to the above-described transfer from shift pattern 3 to shift pattern 5. Thus, a detailed explanation of this change in the shift pattern, and the associated operations of the shift valves and the control valves and the energizing controls of the electronic control device for the ON-OFF solenoid valves 200, 210, 220 and the linear solenoid valves 60, 70, 80 is not repeated.

Figure 9:
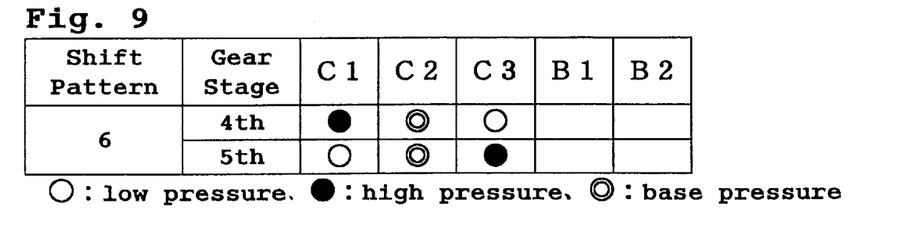
FIG. 9 is a chart showing the transmission condition in shift pattern "6"

The transfer from shift pattern 5 to shift pattern 7 when the gear stage is shifted from the fifth gear stage to the sixth gear stage while the vehicle is cruising at a constant driving (e.g. fifth gear stage) is as follows. The conditions in the fifth gear stage under shift pattern 5 can be seen from the chart in FIG. 8. The chart in FIG. 9 illustrates the transmission condition for a shift pattern 6 which serves as an intermediate shift pattern when transferring from shift pattern 5 to shift pattern 7 and vice versa.

Figure 10:
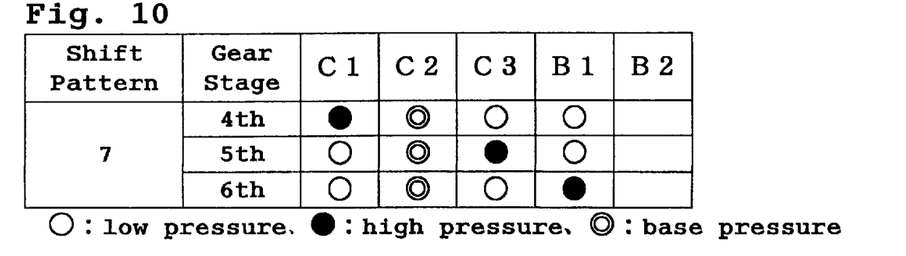
FIG. 10 is a chart showing the transmission condition in shift pattern "7".

The condition or position of the shift valve 170 is changed to the left side position illustrated in FIG. 3 when the ON-OFF solenoid valve 220 is energized as a result of the transfer from shift pattern 5 to shift pattern 6. Upon completion of the switch of the shift valve 170, the linear solenoid valve 80 is energized which causes the control valve 110 to generate a control pressure (low pressure) which fails to engage the friction engaging element C2. Under the resultant condition, the shift control valve 170 interrupts fluid communication between the control valve 110 and the second friction clutch C2, thereby not applying the control pressure to the second friction clutch C2. Instead the base pressure is applied to the second friction clutch C2 as seen in FIG. 9. This results in the gear stage being maintained at the fifth gear stage. Due to the fact that shift pattern 6 is an intermediate shift pattern which appears only when a shift pattern transfer occurs that results from gear stage change, under intermediate shift pattern 6 immediately when the control pressure from the control valve 110 becomes considerably low (smaller than the low pressures shown in FIGS. 6–10), a transfer occurs from intermediate shift pattern 6 to shift pattern 7. FIG. 10 shows the transmission condition during shift pattern 7.

The condition of the shift valve 160 is changed to the left side position illustrated in FIG. 3 when the ON-OFF solenoid valve 210 is deenergized as a result of the transfer from shift pattern 6 to shift pattern 7. Thus, the control pressure from the control valve 110 is applied to the first friction brake B1 by way of the shift valves 150, 160, 170. At this time though, the linear solenoid valve 80 is energized so that a control pressure is applied which is insufficient (low pressure) for engaging the first friction brake B1. In the transfer from shift pattern 6 to shift pattern 7, the energization of the linear solenoid valve 60 is controlled such that the control pressure from the control valve 90 is adjusted so as to be insufficient (low pressure) for engaging the first friction clutch C1, while the linear solenoid valve 70 is made deenergized in order to make the control pressure from the control valve 100 sufficient (high pressure) for engaging the third friction clutch C3. In addition, the second friction clutch C2 is applied with the base pressure which is sufficient for engaging the second friction clutch C2. Thus, immediately upon transfer to shift pattern 7, the fifth gear stage is produced. Further, in response to a shift request, the energization of the linear solenoid valves is controlled according to the chart shown in FIG. 10, thereby producing the sixth gear stage.

A transfer from shift pattern 7 to shift pattern 5 is the reverse of the transfer from shift pattern 7 to shift pattern 5 described above and so a detailed description of such transfer including the energization control for each of the ON-OFF solenoid valves 200, 210, 220 and the linear solenoid valves 60, 70, 80 is omitted. In addition, the shift from the fourth gear stage to the sixth gear stage can be similarly made by a transfer from shift pattern 6 to shift pattern 7 via shift pattern 5. Moreover, in the illustrated and described embodiment, the shift pattern is capable of producing the fourth gear stage and the fifth gear stage, which makes it possible to establish a suitable shift in response to various shift requests.

Thus, in the hydraulic pressure control device in accordance with the present invention, shift pattern 4 and shift pattern 6 serve as intermediate shift patterns that make it possible to establish conditions under which the control pressure from the control valve 90 is not applied to the friction engaging elements under the intermediate shift pattern 4 and the control pressure from the control valve 110 is not applied to the friction engaging elements under the intermediate shift pattern 6. In addition, the shifting is not influenced or disturbed even though the control pressures from the respective control valves 90, 110 change due to a transfer from each of the shift pattern 4 and the shift pattern 6 to the next shift pattern. It is thus not necessary to synchronize the switching of the shift valve through ON-OFF energization of the solenoid valve with the timing of the output of the control pressure to the shift valve. Consequently, time lags associated with other known devices (one beginning at output of the switching signal from the electronic control portion 400 to each of the ON-OFF solenoid valves 200, 210, 220 and terminating in completion of the switching of the corresponding shift valve, and the other beginning at initiation of the energization of each of the linear solenoid valves 60, 70, 80 and terminating in the output of the control pressure from each of the control valves 90, 100, 110) do not affect the operation to the same extent as other known devices. Thus, problems such as insufficient control pressure application to the friction engaging element which is to be applied with sufficient control pressure and applying control pressure to the friction engaging element to which control pressure should not be applied are reduced, thereby significantly improving the shift control efficiency.

Although the present invention has been described with reference to the embodiment described above and illustrated in the drawing figures, it is to be understood that the invention is not limited to the details described and shown. For example, it is possible to employ an arrangement so that when the linear solenoid valve is deenergized the control pressure is prevented from being applied from the control valve to the friction engaging element. Also, the present invention is applicable to automatic transmissions other than those that produce six forward gear stages.

The principles, preferred embodiment and modes of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A hydraulic pressure control device for an automatic transmission comprising:

a plurality of linear solenoid valves each of which adjusts a hydraulic pressure outputted from an oil pump and outputs an adjusting pressure in response to a current applied to the linear solenoid valve;

a plurality of control valves each connected to a respective one of the linear solenoid valves to output a control pressure in response to the adjusting pressure outputted from the respective linear solenoid valve;

a plurality of friction engaging elements each of which is engaged or disengaged depending on the control pressure applied thereto, the friction engaging elements producing a plurality of gear stages of the automatic transmission depending on different combinations of engaged and disengaged conditions of the friction engaging elements;

a plurality of shift valves each connected to one of the control valves to switch the friction engaging elements to which the control pressure is applied depending on the hydraulic pressure applied to the shift valves;

a plurality of ON-OFF solenoid valves each connected to one of the shift valves to control application of the hydraulic pressure to each of the shift valves through energized and deenergized conditions of the ON-OFF solenoid valves; and a control unit which controls application of current to each of the linear solenoid valves and the ON-OFF solenoid valves, the control unit controlling the adjusting pressure applied to each of the control valves and the control pressure applied to each of the friction engaging elements by controlling the hydraulic pressure applied to each of the shift valves, the control unit establishing a first shift pattern and a second shift pattern which produce gear stages by different combinations of energized or deenergized conditions of at least some of the ON-OFF solenoid valves, the control unit establishing during transfer from the first shift pattern to the second shift pattern an intermediate shift pattern which makes it impossible to apply the control pressure from a specific control valve to one of the friction engaging elements in case the one friction engaging element to which the control pressure is applied from the specific control valve under the first shift pattern differs from the friction engaging element to which the control pressure is applied from the specific control valve under the second shift pattern by switching one of the shift valves.

2. The hydraulic pressure control device for an automatic transmission as set forth in claim 1, wherein the switching of the shift valve in the intermediate shift pattern interrupts fluid communication between the specific control valve and the one friction engaging element.

3. The hydraulic pressure control device for an automatic transmission as set forth in claim 2, wherein upon transfer from the first shift pattern to the intermediate shift pattern a specific shift valve is switched to interrupt fluid communication between the specific control valve and the one friction engaging element, while upon transfer from the intermediate shift pattern to the second shift pattern another shift valve other than the specific shift valve is switched to cause the specific control valve to apply the control pressure to the friction engaging element to which the control pressure is applied from the specific control valve under the second shift pattern.

4. The hydraulic pressure control device for an automatic transmission as set forth in claim 1, wherein the first shift pattern is adapted to produce a first gear stage and a second gear stage by controlling energization of a first one of the linear solenoid valves, the second shift pattern is adapted to produce the second gear stage and a third gear stage by controlling energization of a second one of the linear solenoid valves, the intermediate shift pattern is adapted to produce the second gear stage by controlling energization of the first linear solenoid valve, and the control unit controls energization of the first and second linear solenoid valves and the ON-OFF solenoid valves so that during transfer from the first shift pattern to the second shift pattern by way of the intermediate shift pattern, the second gear stage remains produced in each of the first shift pattern, the second shift pattern, and the intermediate shift pattern.

5. The hydraulic pressure control device for an automatic transmission as set forth in claim 4, wherein the control unit controls energization of the linear solenoid valves and the ON-OFF valves when a shift is made from the first gear stage to the third gear stage in such a manner that after a shift is made from the first gear stage to the second gear stage in the first shift pattern, a transfer is made from the first shift pattern to the intermediate shift pattern while maintaining the second gear stage and a transfer is made from the intermediate shift pattern to the second shift pattern and a shift is made from the second gear stage to the third gear stage.

6. A hydraulic pressure control device for an automatic transmission comprising:

a plurality of linear solenoid valves each of which adjusts a hydraulic pressure outputted from an oil pump and outputs an adjusting pressure in response to a current applied to the linear solenoid valve;

a plurality of control valves each connected to a respective one of the linear solenoid valves to output a control pressure in response to the adjusting pressure outputted from the respective linear solenoid valve;

a plurality of friction engaging elements each of which is engaged or disengaged depending on the control pressure applied thereto to produce a plurality of gear stages of the automatic transmission depending on different combinations of engaged and disengaged conditions of the friction engaging elements;

a plurality of shift valves each connected to one of the control valves to switch the friction engaging elements to which the control pressure is applied depending on the hydraulic pressure applied to the shift valves;

a plurality of ON-OFF solenoid valves each connected to one of the shift valves to control application of the hydraulic pressure to each of the shift valves through energized and deenergized conditions of the ON-OFF solenoid valves; and a control unit which controls application of current to each of the linear solenoid valves and the ON-OFF solenoid valves;

the control unit controlling the adjusting pressure applied to each of the control valves and the control pressure applied to each of the friction engaging elements by controlling the hydraulic pressure applied to each of the shift valves;

the control unit establishing a plurality of shift patterns producing gear stages by different combinations of energized or deenergized conditions of at least some of the ON-OFF solenoid valves;

the plurality of shift patterns including one shift pattern producing at least two gear stages and a different shift pattern producing at least two gear stages, with one of the gear stages in the one shift pattern being the same as one of the gear stages in the different shift pattern, one of the control valves applying control pressure to one of the friction engaging elements during the one shift pattern and applying control pressure to a different friction engaging element during the another shift pattern;

the control unit establishing during transfer from the one shift pattern to the another shift pattern an intermediate shift pattern during which control pressure from the one control valve to the one friction engaging element is prevented.

7. The hydraulic pressure control device for an automatic transmission as set forth in claim 6, wherein the control unit establishes the intermediate shift pattern by switching one of the shift valves.

8. The hydraulic pressure control device for an automatic transmission as set forth in claim 7, wherein the switching of the shift valve in the intermediate shift pattern interrupts fluid communication between the one control valve and the one friction engaging element.

9. The hydraulic pressure control device for an automatic transmission as set forth in claim 6, wherein upon transfer from the one shift pattern to the intermediate shift pattern a specific shift valve is switched to interrupt fluid communication between the one control valve and the one friction engaging element, while upon transfer from the intermediate shift pattern to the another shift pattern a shift valve different from the specific shift valve is switched to cause the one control valve to apply the control pressure to the different friction engaging element.

10. A method of shifting an automatic transmission comprising:

supplying control pressure from a plurality of control valves to a plurality of friction engaging elements to effect engagement and disengagement of different combinations of the friction engaging elements and produce a plurality of different gear stages;

establishing one shift pattern that includes at least one gear stage;

transferring to a different shift pattern that includes a gear stage different from the one gear stage;

prohibiting application of control pressure from one of the control valves to one of the friction engaging elements during transfer from the one shift pattern to the different shift pattern when the one control valve applies control pressure to the one friction-engaging element under the one shift pattern and applies control pressure to another friction engaging element different from the one friction engaging element under the different shift pattern.

11. The method according to claim 10, wherein the control pressure is supplied to the friction engaging elements by way of shift valves, the application of control pressure from the one control valve to the one friction engaging element being prohibited by shifting one of the shift valves.

12. The method according to claim 10, wherein the control pressure is supplied to the friction engaging elements by way of shift valves, one of the shift valves controlling the control pressure from the one control valve to the one friction engaging element, the application of the control pressure from the one control valve to the one friction engaging element being prohibited by switching the one shift valve from a position permitting the control pressure from the one control valve to be applied to the one friction engaging element to another position preventing application of the control pressure from the one control valve to the one friction engaging element.

13. The method according to claim 10, including transferring to an intermediate shift pattern during transfer from the one shift pattern to the different shift pattern, the application of the control pressure from the one control valve to the one friction engaging element being prohibited in the intermediate shift pattern.

14. The method according to claim 13, wherein the control pressure is applied from the control valves to the friction engaging elements by way of shift valves, the control pressure being applied from the one control valve to the one friction engaging element during the one shift pattern by way of one of the shift valves, and including shifting the one shift valve from one position in the one shift pattern to a different position in the intermediate shift pattern.

15. The method according to claim 14, including transferring from the intermediate shift pattern to the different shift pattern and applying control pressure to the one friction engaging element from a control valve different from the one control valve in the different shift pattern.

* * * * *